United States Patent [19]

Toshihisa

[11] 4,171,140

[45] Oct. 16, 1979

[54] AUTOMOTIVE SAFEGUARD FOR PROTECTING OCCUPANTS

[76] Inventor: Suga Toshihisa, No. 13-18, 2-chome,Naka-cho, Urawara-shi, Saitama-ken, Japan

[21] Appl. No.: 845,940

[22] Filed: Oct. 27, 1977

[51] Int. Cl.² .............................................. B60R 21/02
[52] U.S. Cl. ................................... 280/749; 296/97 C
[58] Field of Search ............ 280/749; 296/97 R, 97 C

[56] References Cited

U.S. PATENT DOCUMENTS

| | | | |
|---|---|---|---|
| 3,443,824 | 5/1969 | Dietrich | 280/749 |
| 3,782,756 | 1/1974 | Brown | 280/749 |
| 3,909,039 | 9/1975 | Baveryl et al. | 280/749 |

Primary Examiner—Joseph F. Peters, Jr.
Assistant Examiner—Norman L. Stack, Jr.
Attorney, Agent, or Firm—McGlew and Tuttle

[57] ABSTRACT

The present invention provides a novel form of automotive safeguard for protecting occupants when a traffic accident happens. This safeguard comprises a transparent and stretchable shock absorbing plate disposed between a windshield and a front seat in such a way to leave a given interval with respect to the windshield. This safeguard also includes a heater provided to the space defined by the interval, which is used for heating and circulating air inside the space to prevent development of clouding on the windshield when heating the inside of a car during the winter months.

4 Claims, 4 Drawing Figures

AUTOMOTIVE SAFEGUARD FOR PROTECTING OCCUPANTS

BACKGROUND OF THE INVENTION

The present invention relates to an automotive safeguard for protecting occupants when the occupants meet with a traffic accident.

As the safeguard for preventing the occupant from being damaged as a result of his head coming into collision with a windshield in the case that the motorcar is suddenly held by a shock resulting from an accident, use has been so far made of an air bag device in which the air bag is expanded by the action of compressed air or a seat belt device. However, the former device is not necessarily activated at the time when such an accident happens, while the latter device often become useless at a certain running speed.

SUMMARY OF THE INVENTION

The present invention has been contemplated in order to obviate the above-mentioned defects, and relates to an automative safeguard characterized in that a transparent, stretchable shock absorbing plate formed of for instance silicone rubber is disposed between a windshield and an occupant.

A main object of the present invention is to provide an automative safeguard for protecting occupants which is designed so that, when an accident happens, the head of the occupant is retained by the shock absorbing plate to prevent the head from coming into collision with the windshield whereby the occupant does not suffer from any damage.

Another object of the present invention is to provide a transparent, flexible shock absorbing plate of which the surface in neither flawed nor clouded during its longer service.

Further object of the present invention is to provide a device for preventing development of clouding on the windshield when heating the inside of a car during the winter months.

Other object and advantages of the present invention will be apparent, to one of ordinary skill in the art, by referring to the following specification and drawings.

BRIEF DESCRIPTION OF THE ACCOMPANYING DRAWINGS

DETAILED DESCRIPTION OF THE INVENTION

Figure 1:
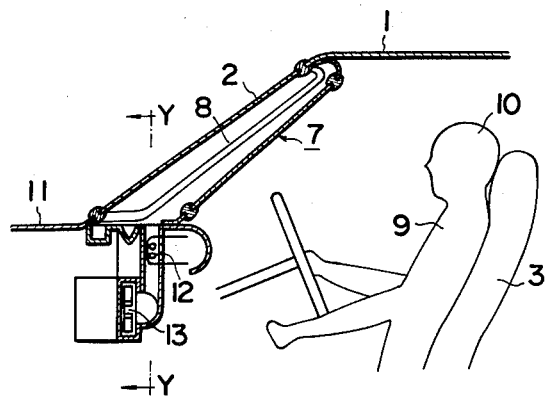
FIG. 1 is a transverse section showing the safeguard according to the present invention.
Figure 2:
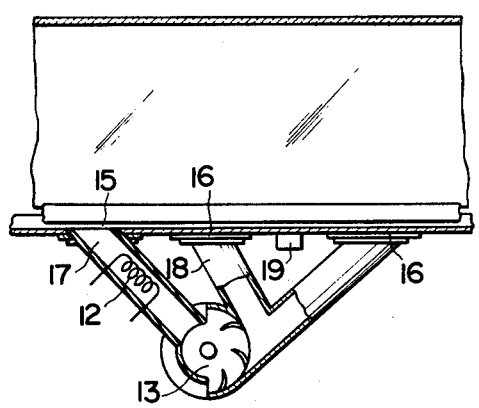
FIG. 2 is a longitudinal section taken along line Y—Y of FIG. 1.
Figure 3:
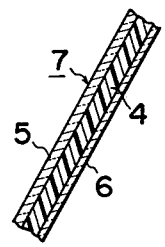
FIG. 3 is a partially enlarged section showing the shock absorbing plate.

According to the present invention, a shock absorbing plate 7 comprising a transparent, stretchable film 4 formed of for example silicone rubber on both surfaces of which are respectively ordinary glass 5 and reinforced glass 6, is disposed between a windshield 2 and a front seat 3 of a motorcar 1 in such a way to leave a given interval 8 with respect to the windshield. This interval 8 takes up such a space that assures that, upon collision, the head 10 of occupant 9 on the front seat 3 does not smash into the windshield 2. This interval may be narrowed considerably in the case that the windshield 2 is designed so that it is dislogded due to wind pressure generated in the space 8 upon collision. The space 8 is provided at its lower end with a panel 11. A car heater 14 having a heat source 12 and a fan 13 is mounted to the panel 11 with the suction inlet 15 and discharge outlet 16 being connected with a suction pipe 17 and a discharge pipe 17, respectively. The space 8 is closed except for a filtertipped air outlet 19 provided communicably to the panel 11.

In the foregoing embodiment, when the inside of a motorcar is heated, the car heater 14 is activated to rotate the fan 13 so that air inside the space 8 is sucked through the suction inlet 15. The air is then heated by the heat source 12, and is discharged from the discharge outlet 16 into the space 8 so that air inside the space 8 is heated. As a result, the windshield 2 and the shock absorbing plate 7 are heated to prevent development of clouding thereon.

In the safeguard according to the present invention, the filtertipped air outlet 19 is provided so that, when air enters or leaves the safeguard due to an atmospheric pressure difference between its inside and outside, penetration of dust is blocked; thus preventing dust from being deposited on the windshield 2 and the shock absorbing plate 7. In other words, the interior of space 8 is always kept clean. In addition, since air circulating through the car heater 14 is available only from air inside space 8, the rise in temperature can be achieved rapidly, efficiently and uniformly, with the result that the windshield 2 and the shock absorbing plate 7 can be heated without having any influence on the heating temperature inside the motorcar.

Figure 4:
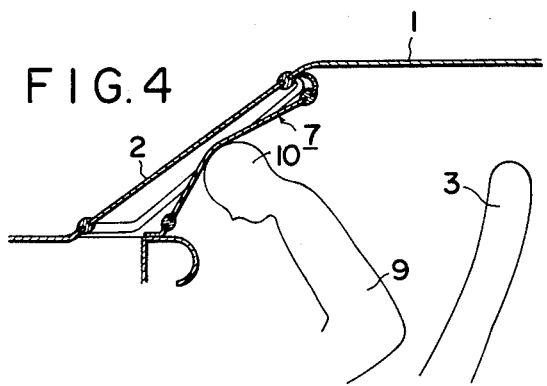
FIG. 4 is a transverse section showing a collision state.

When a traffic accident happens, the head 10 of occupant 9 is wrapped in the shock absorbing plate as shown in FIG. 4 and is brought to a halt therein, so that acceleration is attenuated, resulting in protection of the occupant. Further, according to the present invention, the shock absorbing plate 7 is constructed from the stretchable film 4 formed of for instance silicone rubber which has its surface ordinary glass 5 and on its rear surface reinforced glass 6, so that, even when the head 10 of occupant 9 comes into collision therewith, the plate is not broken due to presence of reinforced glass 6. Thus, the occupant will not suffer from any lacerated wound by broken pieces of glass.

The reinforced glass breaks to fine pieces so that no large sized shart pieces contact the occupant and major injury is less likely.

According to the present invention, when the windwhield 2 is broken as a result of a small stone colliding with it, the broken pieces of glass are blocked by the shock absorbing plate 7. Thus, the occupant will not suffer from any damage by such a stone.

It is to be understood that the present invention is not limited to the foregoing embodiments.

What is claimed is:

1. In a vehicle having a front windshield, a front dashboard below the windshield, and a front seat to the rear of the windshield, the improvement comprising an occupant safety shield comprising a shock absorbing protection plate, mounting means mounting said protection plate so that it is positioned between the front seat and the windshield and overlies the entire windshield and defines an air space above the dashboard between said plate and said windshield, said protection plate comprising an intermediate transparent impact absorbing stretchable film cushioning element, and a reinforced safety glass plate on the side of said film facing the seat being constructed to withstand stress but being breakable if stressed beyond its stressing point into fine glass pieces so as to minimize exposure of the occupant to large size glass pieces which might produce a fatal injury, said glass plate and said film together defining a cushioning element for the occupant.

2. In a vehicle according to claim 1 wherein said protection plate includes an inner glass plate disposed on the side of said film windshield.

3. In a vehicle according to claim 2 including a filtered passageway venting said air space to the exterior, said dashboard having a top surface said mounting means mounting said protection on said top surface of said dashboard spaced inwardly from said windshield, said conduit having an inlet and an outlet connected into said top surface of said dashboard and into the air space.

4. In a vehicle according to claim 1 including a closed heater conduit connected to the air space for circulating heated air thereto.

* * * * *